US006851619B1

(12) United States Patent
Wesseling et al.

(10) Patent No.: US 6,851,619 B1
(45) Date of Patent: Feb. 8, 2005

(54) METHOD AND DEVICES FOR PRINTING A FRANKING MARK ON A DOCUMENT

(75) Inventors: Hennie Wesseling, Leidschendam (NL); Dick Brandt, Leidschendam (NL); Antonius Johannes Franciscus Van Halderen, Zoetermeer (NL); Rob Pieterse, Aerdenhout (NL); Niels Alexander Van Golden, Gouda (NL); Johannes Francis Gerlofs, Uithoorn (NL)

(73) Assignee: PTT Post Holdings B.V., Ak Den Haag (NL)

( * ) Notice: Subject to any disclaimer, the term of this patent is extended or adjusted under 35 U.S.C. 154(b) by 0 days.

(21) Appl. No.: 09/856,302

(22) PCT Filed: Nov. 19, 1999

(86) PCT No.: PCT/EP99/09170

§ 371 (c)(1),
(2), (4) Date: Aug. 17, 2001

(87) PCT Pub. No.: WO00/37693

PCT Pub. Date: Jun. 2, 2000

(30) Foreign Application Priority Data

Nov. 20, 1998 (NL) .............................................. 1010616

(51) Int. Cl.[7] .............................................. G06K 19/06

(52) U.S. Cl. .............................................. 235/494

(58) Field of Search ................................ 235/494, 487, 235/375, 382, 492, 493; 380/51; 705/401–408, 409, 410; 340/825; 400/61, 103

(56) References Cited

U.S. PATENT DOCUMENTS 4,649,266 A 3/1987 Eckert
4,700,294 A * 10/1987 Haynes ........................ 341/106
5,390,251 A 2/1995 Pastor et al.

(List continued on next page.)

FOREIGN PATENT DOCUMENTS

EP 0 331 352 9/1989
EP 0 689 150 A2 12/1995
EP 0 854 444 A2 7/1998

*Primary Examiner*—Thien M. Le
*Assistant Examiner*—Edwyn Labaze
(74) *Attorney, Agent, or Firm*—Young & Thompson

(57) ABSTRACT

A method and device for printing a franking mark on a document by making available a unique bit string; establishing an identification code; and securely printing the franking mark on the document. The franking mark at least includes information relating to the bit string and the identification code. The bit string is selected from a centrally stored set of unique bit strings, and the unique bit strings which are made available for use are centrally registered.

23 Claims, 8 Drawing Sheets

U.S. PATENT DOCUMENTS 5,432,506 A * 7/1995 Chapman ............... 340/825.34
5,448,641 A * 9/1995 Pintsov et al. ................ 380/51
5,661,807 A * 8/1997 Guski et al. .................. 380/25
5,666,284 A 9/1997 Kara
5,671,146 A * 9/1997 Windel et al. .............. 705/410
5,688,056 A * 11/1997 Peyret ........................ 235/382
5,826,247 A * 10/1998 Pintsov et al. .............. 705/404
5,835,689 A 11/1998 Braun et al.
5,838,812 A 11/1998 Pare, Jr. et al.
5,936,865 A * 8/1999 Pintsov et al. .............. 700/107
5,953,426 A * 9/1999 Windel et al. ................ 380/51
6,000,832 A * 12/1999 Franklin et al. ............ 235/380
6,024,287 A * 2/2000 Takai et al. ................. 235/493
6,064,994 A * 5/2000 Kubatzki et al. ........... 235/375
6,082,776 A * 7/2000 Feinberg ...................... 283/72
6,085,321 A * 7/2000 Gibbs et al. ................ 713/170
6,134,328 A * 10/2000 Cordery et al. ............... 380/55
6,141,441 A * 10/2000 Cass et al. .................. 235/494
6,148,292 A * 11/2000 Reisinger et al. ............. 705/30
6,169,978 B1 * 1/2001 Lutz et al. .................. 705/406
6,170,744 B1 * 1/2001 Lee et al. ................... 235/380
6,199,752 B1 * 3/2001 Bornemann et al. ........ 235/375
6,330,976 B1 * 12/2001 Dymetman et al. ......... 235/487
6,381,589 B1 * 4/2002 Leon ........................... 705/60
6,385,504 B1 * 5/2002 Pintsov et al. .............. 700/226
6,390,577 B1 * 5/2002 Fajour ........................... 347/2
6,405,923 B1 * 6/2002 Seysen ....................... 235/451
6,415,983 B1 * 7/2002 Ulvr et al. .................. 235/487
6,418,422 B1 * 7/2002 Guenther et al. ........... 705/401
6,424,954 B1 * 7/2002 Leon .......................... 705/401
6,587,843 B1 * 7/2003 Gelfer et al. ................. 705/60

* cited by examiner

ISSUE OF ELECTRONIC STAMP

ISSUE OF ELECTRONIC STAMP WITH COUNTER

PRINTING OF ELECTRONIC STAMP

PRINTING WITH COUNTER

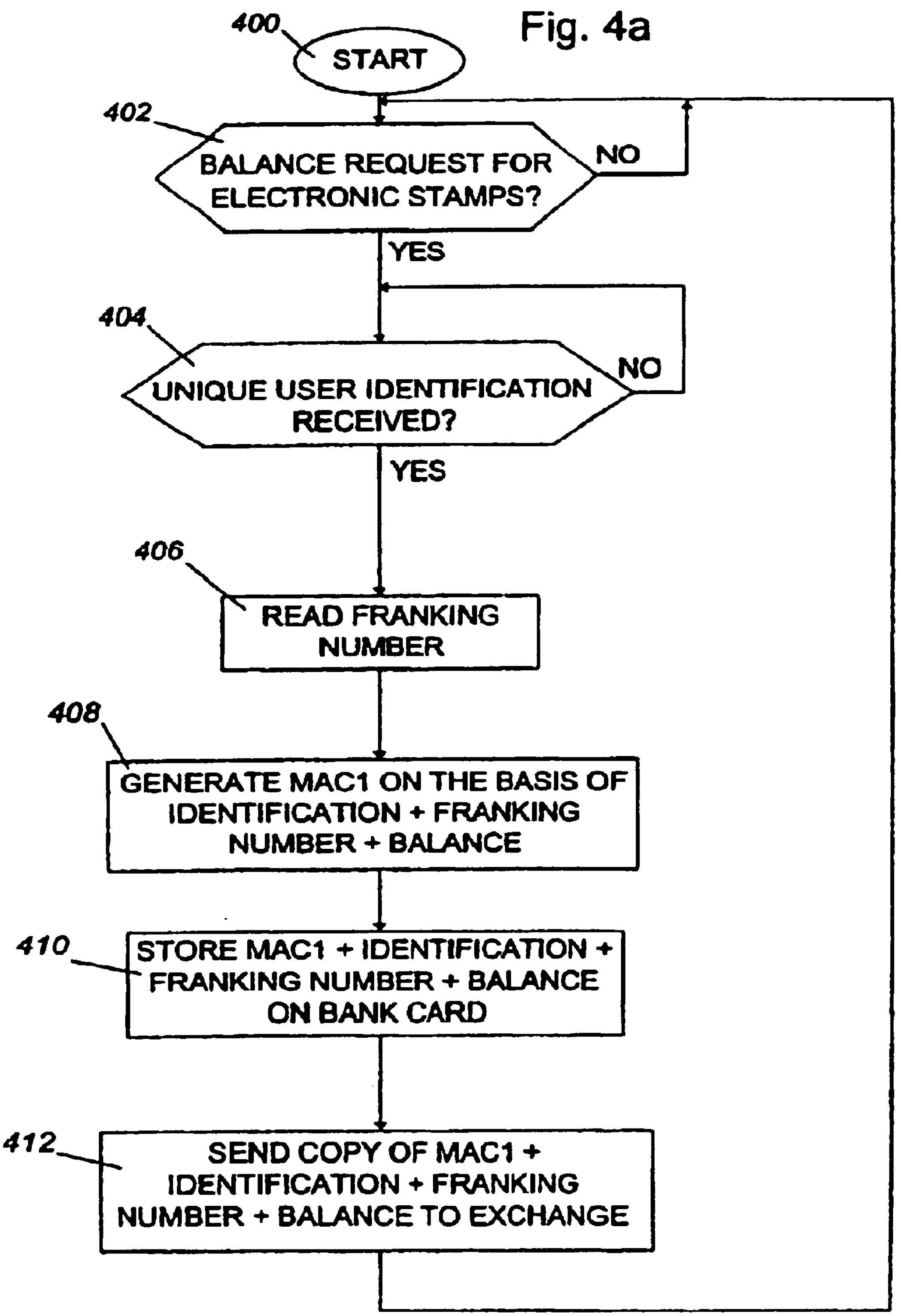
STORING ELECTRONIC STAMP IN PC EMBODIMENT

PRINTING VIA PC EMBODIMENT

METHOD AND DEVICES FOR PRINTING A FRANKING MARK ON A DOCUMENT

BACKGROUND OF THE INVENTION

The present invention is related to a method for printing a franking mark on a document, comprising the following steps:

a. making available a unique bit string;
b. establishing an identification code;
c. securely printing said franking mark on the document, said franking mark at least comprising information relating to the bit string and the identification code.

"Franking mark" here refers, for example, to an electronic postage stamp, that is to say a mark printed on a postal article by a franking machine or a printer, which inter alia can represent a franking value for said postal article. In the context of the present invention, however, "franking mark" has a wide meaning. The concept "franking mark" can refer to all kinds of marks which can be placed on arbitrary documents for securing said documents. Besides postal articles, such documents can also be value documents, such as admission tickets, payment slips, etc., which are protected by such a mark.

A method of the kind mentioned in the beginning is disclosed in the following two documents made public by the Engineering Center for United States Postal Service (USPS): "Information Based Indicia Program (IBIP), Open System Indicium Specification" and "Information Based Indicia Program (IBIP), Open System Postal Security Device (PSD) Specification", both dated 23 Jul. 1997 (draft documents)

With such a method, electronic postage stamps can be obtained and printed on postal articles. The device, for example a computer, with which the electronic postage stamp is printed is thereto provided with a Postal Security Device (PSD), to which a unique identification code is related. The electronic postage stamp comprises various elements, of which a few are mentioned as "security critical": the identification code of the PSD, the value of the contents of an incremental register, the franking value of the postal article and a digital signature. The contents of the incremental register represent the total monetary value of all hitherto printed electronic postage stamps with the related PSD. The combination of identification code and the contents of the incremental register represents a unique bit string per postal article. Since the manner in which said unique bit string is composed must comply with a known rule, the value of a following unique bit string for a following electronic postage stamp can be predicted, which is disadvantageous in regard to possible fraud.

In an article by J. Quittner in FOX Market Wire of 9 Apr. 1998, "Neither bugs, nor hackers, nor Pitney Bows will keep E-stamp from delivering your postage", available on the Internet on 5 May 1998, such a system, which meets these specifications and originates from the firm of E-Stamp, is described. The system of E-Stamp also makes use of a personal computer for printing a franking mark on a postal article directly with the aid of a regular printer connected to said personal computer. The personal computer is connected, via the Internet, with the United States Postal Service. Via the Internet, "electronic postage stamps" can thus be bought at the United States Postal Service. The franking value of the electronic postage stamp is debited directly from the savings balance of the related client and stored and protected in the PSD. The PSD is a small box which can be inserted at the rear of a regular laserprinter. As soon as a user has issued a command to print an electronic postage stamp on a postal article, an electronic postage stamp is downloaded and the printer prints a two-dimensional bar code, after which the value of the printed "postage stamp" is debited from the total franking value is debited in the postal security device.

According to the publication of J. Quittner, the electronic postage stamp in the system of E-Stamp comprises in any case an identification code of the user, an identification code of the postal security device, the franking value, the delivery type (for example by express delivery), the sender's address and the date. The electronic postage stamp can further also contain data related to the sending company, and room is provided for possible advertisements.

SUMMARY OF THE INVENTION

The object of the invention is a further protection of franking marks.

To this end, the invention is related to a method such as described above and which is characterised in that the bit string is selected from a centrally stored set of unique bit strings and that the unique bit strings which have been made available for use are centrally registered.

According to the invention, each unique bit string used is thus centrally generated and registered, and said bit string is moreover coupled to the user who has bought an electronic postage stamp and/or the machine which prints the electronic postage stamps. It can thus not only be centrally detected whether the electronic postage stamps are used only once, but fraud can also be easily traced to the source. Further, the use of a PSD can thereby possibly be waived.

In a first embodiment, the unique bit string and the identification code, protected with the aid of a first message authentication code and/or protected by encoding, are stored, prior to step c, by a terminal on an information carrier with memory, step c taking place after the information carrier has been read in by a printing device. Such an information carrier can, for example, be a chip card, on which several such unique bit strings, together with the identification code, can be stored. The identification code can, for example, be derived from the number of the bank or ATM (Automated Teller Machine) card with the aid of his personal identification number (PIN).

It is possible that such a bank card or ATM card is a a multi-functional chip card, for example a Chipper® of the Netherlands KPN Telecom and Postbank, which serves inter alia as an electronic purse. It is further possible that such a bank/ATM card is used for the direct payment of the necessary franking value, and that the same card is subsequently used as information carrier for storing the is said unique bit strings together with the identification code.

Besides the unique bit string and the identification code, a terminal identification code, protected with the aid of the first message authentication code and/or by the encoding, is then stored on the information carrier with memory by the terminal. Not only can the user, in that case, be uniquely derived from the franking mark, but also the terminal whereby the user purchased his electronic postage stamps.

After the reading of the information carrier by the printing device, the use of the unique bit string for printing a further franking mark on a further document is preferably rendered impossible by the printing device.

In cases in which a user wishes to print large numbers of franking marks on documents, it can be awkward, if not physically impossible, to have to store such large numbers of unique bit strings on a chip card. The storage of large numbers of bit strings can be avoided in an embodiment of the invention in which, together with the unique bit string, the value of a counter is also maintained. The counter then determines the maximum number of times that the unique bit string may be used for printing the franking mark on documents. Alternatively, the counter represents a balance for electronic postage stamps which may be debited to the value of zero. In that case, after the reading of the information carrier, it is checked whether the value of the counter on the information carrier lies within certain predefined limits. If that is the case, the value of the counter is adjusted after reading. If not, printing of the franking mark is blocked.

In a second embodiment of the method according to the invention, use is made, when executing step c, of a printing device connected to a (personal) computer. In this PC embodiment, use is preferably made of a bank card (smartcard), which, via suitable input/output means, communicates with the PC and in fact takes over the function of a PSD, which therefore has become redundant.

In this second embodiment of course, a counter, which is added to a unique bit string and determines the maximum number of times that the unique bit string for printing the franking mark on documents may be used, or which represents a monetary value that may be expended for electronic postage stamps, can also be used.

The identification code can comprise a user identification code and/or a printer identification code. The user identification code, for example, can contain at least the number of the bank/ATM card of the user. The printer identification code is preferably coupled to a SAM which is used to print the franking mark, protected by a MAC (=message authentication code, or a digital signature) or via encoding, on the document. Said SAM can be located in a separate franking machine, but also in a (personal) computer especially arranged for this purpose.

The franking mark will preferably be printed with a second message authentication code. A secret relationship exists between said second message authentication code and the franking mark, which will be known only to the appropriate authorities, whereby it will be impossible to change data from the franking mark unnoticed. Alternatively, the data can also be stored in encoded form.

For implementing the method according to the invention, the set of unique bit strings is stored in a first central memory, used combinations of identification codes and unique bit strings are stored in a second central memory, franking marks printed on documents are read in, combinations of identification codes and unique bit strings present in the read-in franking marks are stored in a third central memory, and these are compared to the combinations stored in the second central memory. In this way it can be checked precisely how each unique bit string is used, and any fraudulent users can be traced. It can be checked, for example, whether each unique bit string is used only once and whether someone has not copied a franking mark.

For implementing the method according to the invention, the invention is also related to a system for printing a franking mark on a document, comprising:

a. means for making available a unique bit string;

b. means for establishing an identification code;

c. means for securely printing the franking mark on the document, said franking mark at least comprising information relating to the bit string and the identification code;

characterised in that the means for making available the unique bit string comprise a first centrally arranged memory with a set of unique bit strings, from which the unique bit string is selected, and that means are provided for centrally registering which unique bit strings are made available for use.

The present invention is also related to an exchange provided with a first central memory having a set of unique bit strings, a second central memory for storing the combinations of identification codes and provided unique bit strings, said combinations corresponding with franking marks which have been printed on a document, central input means for inputting franking marks printed on documents, a third central memory for storing combinations of identification codes and unique bit strings present on the inputted franking marks, and processor means connected to the central input means and the first, second, third central memories for mutually comparing the data in the second and third central memories. An "exchange" as used in the present application refers to a central station that has the first, second and third central memories.

The invention is further related to means for a device which is arranged for printing a franking mark on a document, said means being at least arranged for receiving data from an information carrier, said data at least comprising a unique bit string originating from a set of unique bit strings for compiling and making data available for the franking mark for the document in protected form, so that the device can print the franking mark on the document securely, said franking mark comprising at least the said data as well as an identification code. Said means can have the form of a separate burglar-proof module. Alternatively, however, they can also comprise several elements which must be implemented in the related device.

Such means are preferably arranged to check, after reception of the data from the information carrier, whether the value of a counter on the information carrier lies within predefined limits, and, if this is the case, to instruct the information carrier to adjust the value of the counter, and, if this is not the case, to block the printing of the franking mark.

The invention is also related to an information carrier provided with a memory in which at least the following data is included: either a unique bit string selected from a set of unique bit strings, an identification code, and a message authentication code which is calculated on the basis of at least the unique bit string and the identification code, or the unique bit string and the identification code in encoded form.

Finally, the invention relates to a computer-readable information carrier, which is provided with software, as well as a data carrier wave which, after being read in, enables the computer to execute a method for printing a franking mark on a document, comprising the following steps:

a. the reception of a unique bit string;

b. establishing an identification code;

c. securely printing the franking mark on the document, said franking mark at least comprising information relating to the bit string and the identification code;

where the bit string is received from a centrally stored set of unique bit strings.

BRIEF DESCRIPTION OF THE DRAWINGS

The present invention will be explained below with reference to some drawings intended only as an illustration of the invention and not as a limitation thereof. In particular, the invention has broader application than postal traffic only.

FIGS. 4*a* and 4*b* show the steps of a method according to the invention in which use is made of a personal computer;

DETAILED DESCRIPTION OF THE PREFERRED EMBODIMENT

Figure 1:
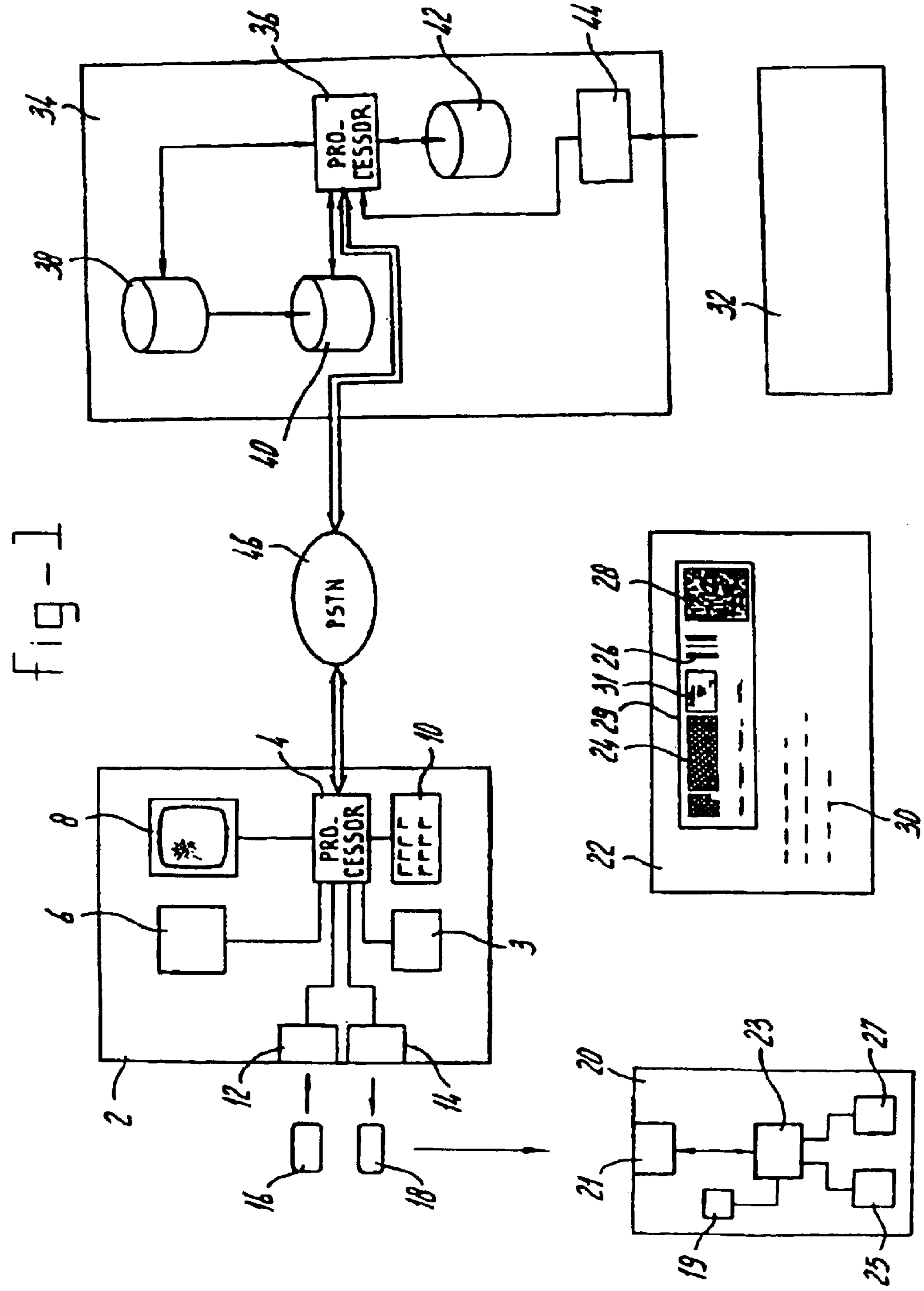
FIG. 1 shows an embodiment of a system according to the invention, in which use is made of an information carrier in which one or more electronic postage stamps can be stored.

In FIG. 1, reference number 2 refers to a terminal, which, for example, is set up in the wall of a post office. Said terminal 2 can communicate with a central station or an exchange 34, for example via the public switched telephone network (PSTN) 46. Communication paths via other networks are of course possible. In this case, use can be made of the Internet. Communication can also take place in other ways, for example via CDROMs, floppy disks, etc.

The terminal 2 shown in FIG. 1 comprises a processor 4, which is coupled to display means 8 for communicating with a user. Said terminal 2 also comprises a memory 6, which is connected to said processor 4. Reference number 10 refers diagrammatically to a keyboard, with which a user can input data and instructions for said processor 4. To this end, said keyboard 10 is connected to said processor 4. Said processor 4 is further connected to a Secure Access/Application Module 3 (usually called "SAM"). The SAM 3 is shown in FIG. 1 within terminal 2. If so wished, SAM 3 may also be present outside terminal 2. If desired, SAM 3 may even be mounted near or in exchange 34.

In the embodiment shown in FIG. 1, said terminal 2 is provided with two input/output units 12, 14. In said input/output unit 12, a bank card or ATM card can be inserted. Said input/output unit 12 is thereto provided with one or more suitable connectors (not shown) which can be brought into contact with the bank card and/or ATM card 16, as persons skilled in the art will know. With such a bank card and/or ATM card, the user can identify himself and effect a PIN payment. In the event that said bank/ATM card contains an electronic purse, the user can herewith also effect payment actions, for example the payment of an electronic postage stamp which is to be printed on a postal article.

Said input/output unit 14 is arranged for accepting an information carrier 18, which can be a chip card. To this end, said input/output means 14 are provided with one or more suitable connectors which can come into contact with the processor (not shown) on said chip card 18, as persons skilled in the art will know. On such an information carrier 18, one or more electronic postage stamps, in an embodiment of the invention, are stored. Such postage stamps are then preferably stored under protection of a message authentication code (MAC) and/or protection by encoding.

In an embodiment, the ATM card/bank card is a multifunctional chip card, which inter alia can be used for payment purposes but also offers possibilities for other applications. An example of such a chip card is the Chipper® of the Netherlands KPN Telecom and Postbank. In that case, said cards 16 and 18 can be the same card and said input/output means 12 can be omitted.

Alternatively, said information carrier 18 can also be a card with, for example, a magnetic strip which itself is not provided with processor means. Data can then be written to, read from and deleted from the magnetic strip by said terminal 2. In that case, electronic postage stamps can be stored under protection by encoding. It is imaginable that said terminal 2 has a supply of such magnetic strip cards and that a customer buys one or more of such cards. On the magnetic strip, one or more of such electronic postage stamps can then be stored. Such magnetic strip cards can be disposable cards. Optionally, chip cards-can also be used as disposable cards.

In FIG. 1, the reference number 20 refers to a franking machine. Said franking machine 20 is provided with input/output means 21 for accepting said information carrier 18. Said franking machine 20 is also provided with a processor 23, which, besides being connected to said input/output means 21, is also connected to weighing means 25, a printer 27 and a SAM 19.

Via said input/output means 21, said processor 23 can communicate with said information carrier 18.

With the aid of said weighing means 25, the franking machine 20 can determine the weight of a postal article 22.

With the aid of said printer 27, the franking machine 20 can subsequently print information 29 on said postal article 22.

Said information 29 comprises, for example, human-readable data 24 related to the mail-sending organization (or other advertising), as well as a marking sign 26 (for example a bar code) enabling automatic orientation of the postal article in a stamping/sorting machine, and a franking mark 28, for example in the form of a two-dimensional bar code 28, which contains further, possibly encoded, information. Said franking mark 28 shall at least contain a unique bit string, of which the use will be explained further on, and an identification code. The identification code identifies the user, i.e. the person who purchased the electronic postage stamp, and/or the device with which the franking mark is printed. If the identification code is coupled to the printing device, this can, for example, be a unique code associated with said SAM 19. In that case, the owner of the franking machine is responsible for possible fraud with the use of electronic postage stamps.

As identification code for the user, the number of said bank card 16 can be used. The bank card number is after all a unique number which is coupled to the user, while a reasonable degree of certainty can be provided that the user is the owner of said bank card 16 by having him identify himself via a PIN code.

Further, said franking mark 28 can comprise information related to the terminal 2 and the franking machine 20, as well as the type of postal delivery (regular, express delivery, registered, per air mail, etc.).

The franking value can also be printed on the postal article 22 in human-readable form 31.

On said postal article 22, space is allocated for the address 30 of the addressee.

The system shown in FIG. 1 contains a device 32 to read in said postal articles 22 during dispatch from the sender to the addressee. If the unique bit string directly represents a franking value, the franking value, for example, can be checked. The data read in by said device 32 can be supplied to the exchange 34. The information which is read in by said device 32 can be supplied to said exchange 34 in any prior art manner.

For inputting the information to a processor 36 present in said exchange 34, said exchange 34 is provided with suitable input means 44 which are connected to said processor 36.

For implementing the method according to the invention, said exchange 34 is preferably provided with three memories 38, 40, 42. Of course these are not required to be physically separate memories. They can refer to different fields within one larger memory.

Figure 2A:
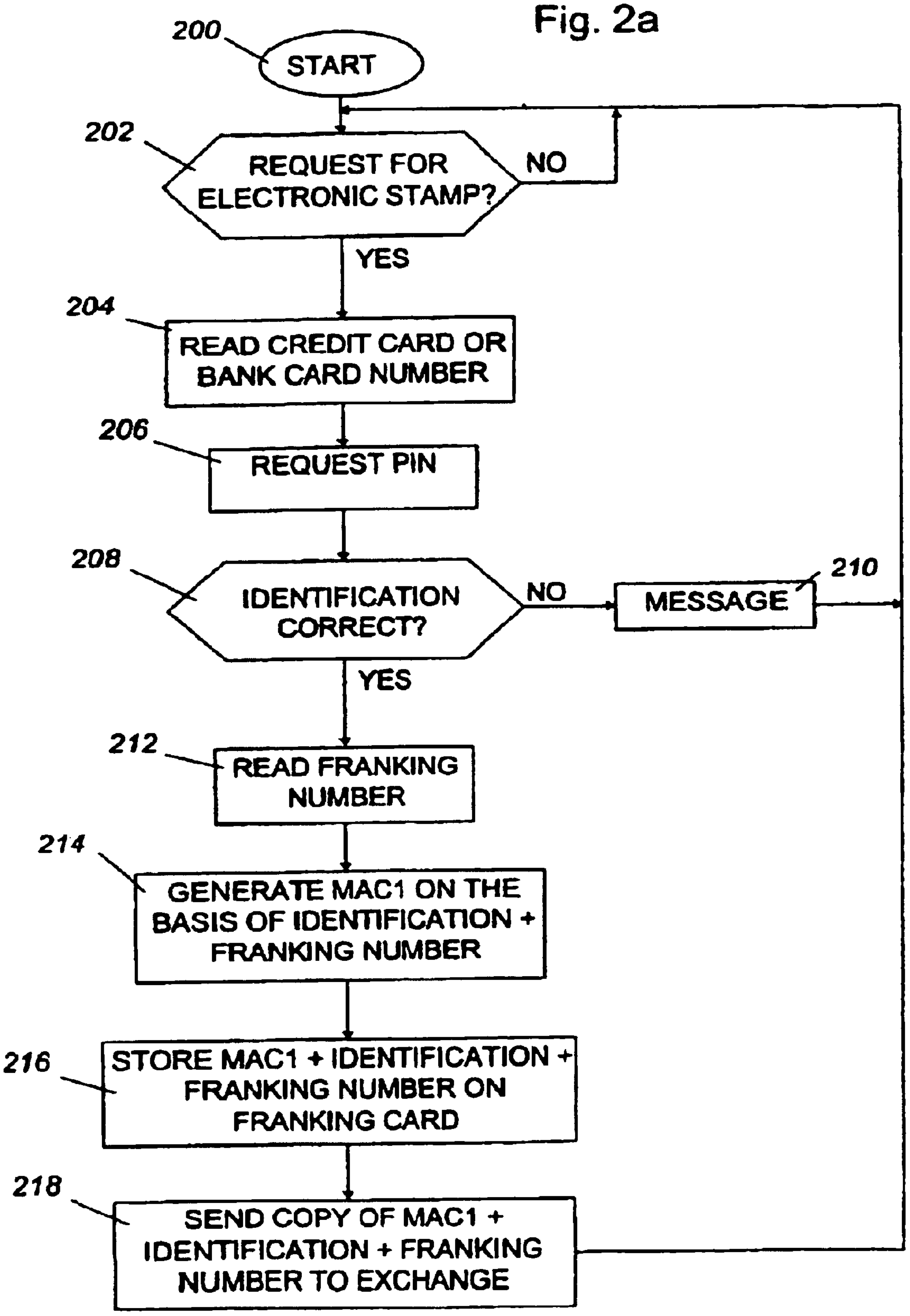
FIG. 2*a* shows the steps of a method for providing an electronic postage stamp.

FIG. 2*a* shows a possible embodiment of the functioning of the terminal 2 during operation.

A customer arrives at said terminal 2 and inserts his bank card 16 (this shall hereinafter be used to refer to both a bank/ATM card or any (multi-functional) chip card) in the corresponding input/output means 12. The processor 4 requests, via the monitor B, which type of electronic postage stamps the customer wants to have. The customer can, for example, indicate that he wishes to purchase a franking card 18 (this term shall be used hereinafter for every possible type of information carrier 18) with 100 electronic postage stamps of 80 cents. This takes place in step 202.

Said processor 4 reads the number of the bank card 16 and asks the user to identify himself with his PIN code, steps 204 and 206.

In step 208, said processor 4 checks, in a manner known per se, whether the customer has identified himself correctly. If not, an error message follows in step 210. After the error message in step 210, said processor 4 can return to the beginning of the flowchart drawn in FIG. 2*a*. Alternatively, a user can, as known per se, be given three opportunities to enter the correct PIN code.

If a user has identified himself in the correct manner, the program in said processor 4 jumps to step 212 and reads a franking number. In accordance with the invention, the franking number consists of a bit string which is unique and is selected from a set of unique bit strings.

The set of unique bit strings is stored in said memory 38 in said exchange 34. Said exchange 34 is connected with several terminals 2 distributed across the country and can, for example via the PSTN 46, make one or more unique franking numbers available from the set of unique franking numbers for said terminals 2. In that event, a certain amount of desired unique franking numbers can be transferred per transaction from the memory 38 in the exchange 34 to the memory 6 in the terminal 2. Alternatively, however, each of the terminals 2 can have stored a certain supply of unique franking numbers in said memory 6 beforehand, so that it is not required to establish a connection between the terminal 2 and the exchange 34 each time a transaction with a customer takes place. Transmission of the unique bit strings can be protected in any prior art manner.

The set of unique franking numbers in the memory 38 of the exchange 34 consists, for example, of bit strings of 128 bits. This set thus contains such a large number of unique franking numbers that the need for such numbers will be covered for years.

Preferably prior to step 212, the customer pays the franking card 18 in an electronic manner. This is done with the aid of the bank card 16 in a manner known per se. That is to say that, if said bank card 16 is a regular bank card, payment takes place by debiting the customer's bank balance. The manner in which this is done is known to those skilled in the art and does not require further explanation here. In the case that said bank card 16 comprises an electronic purse, the amount owed can be debited directly from the balance of said bank card 16. Payment can also take place in cash.

The processor 4 then provides, via the input/output means 14, a separate franking card 18 in which both the identification code and the related franking numbers are stored. In one embodiment, said identification code and said franking numbers are stored with a message authentication code MAC1, which is calculated by the SAM 3 of the terminal 2 together with the processor of the bank card 16. As known, a MAC is a checksum of supplied text by means of which it can be checked whether the supplied text is valid. Each modification in the text (in this case the identification code and the franking numbers) can be detected. A MAC can only be cross-checked with a secret key, which is known only to said SAM 3 and the appropriate postal authorities. The generation of MAC1 and the storage of the required data on the franking card 18 takes place in steps 214 and 216. If several franking numbers are made available for use, the calculation of as many MAC1, may cost too much time. Therefore, as desired, the calculation of MAC1 may be limited to a calculation over the identification code and/or other known data such as date of issue, value etc.

As an alternative for the calculation of a MAC, the data can also be stored in encoded form.

For further protection of the whole, the processor 4 preferably sends a copy of the identification code with the issued franking numbers, protected by MAC1 and/or protected by encoding, to the exchange 34, which stores this information in memory 40 so that at a later stage possible fraud can be checked centrally, step 218. This will be further discussed later.

If desired, a terminal code, which uniquely identifies the terminal 2 which issued the franking card 18, can be stored in the memory of the franking card 1B. If desired, said terminal code can form part of the calculation which the MAC1 has supplied. The terminal code, namely, can then not be changed unnoticed either.

Figure 3A:
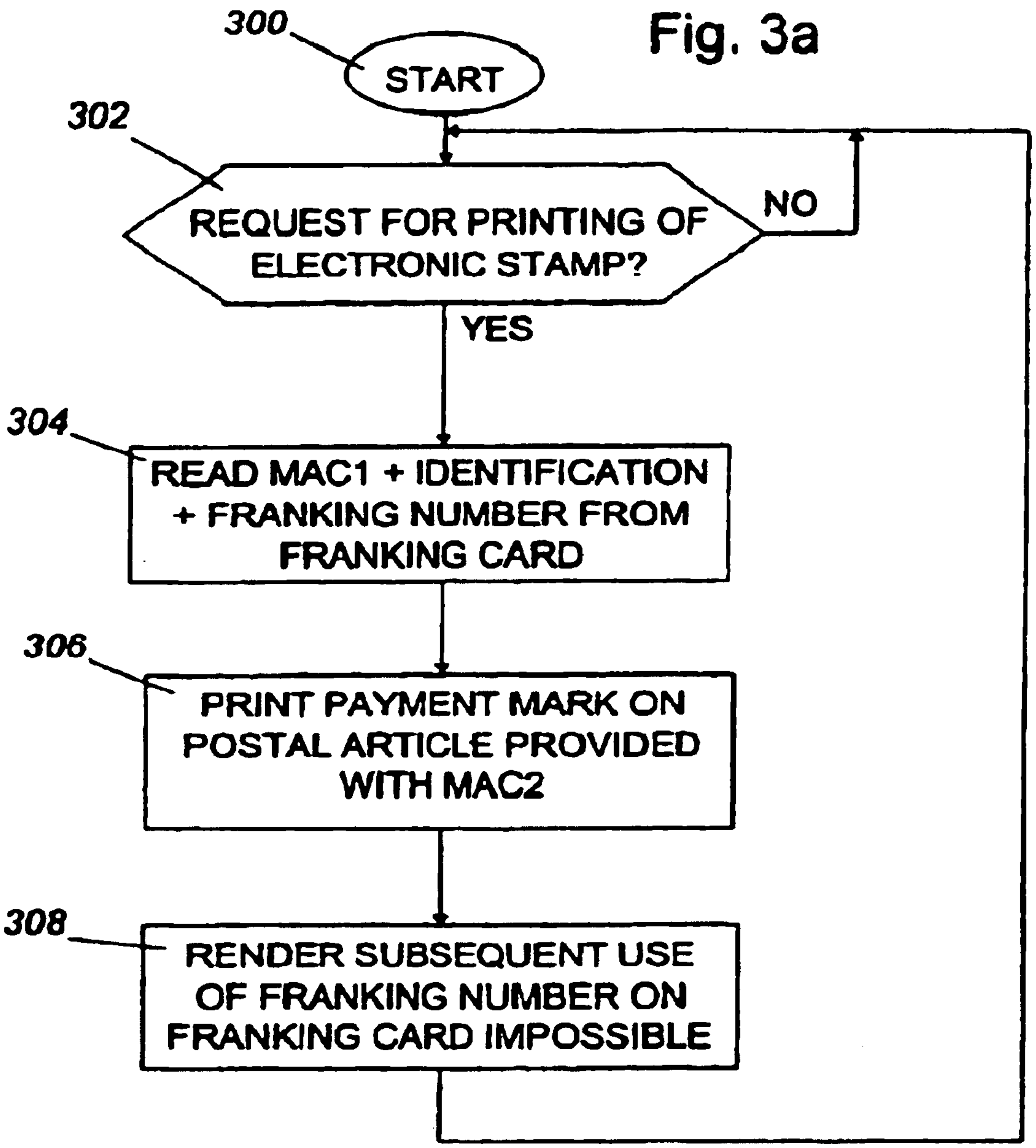
FIG. 3*a* shows the steps for printing an electronic postage stamp.

FIG. 3*a* shows a flowchart of the functioning of franking machine 20 in accordance with the method as explained with reference to FIG. 2*a*.

A user inserts his franking card 18 in the input/output means 21 of the franking machine 20 intended for this purpose. By doing so, contact is established between the franking card 18 and the processor 23 of the franking machine 20. Via suitable input means (for example a keyboard, not shown), the user issues a command to said processor 23 to print an electronic postage stamp on postal article 22. As soon as said processor 23 has established that such an instruction has been received, step 302, said processor 23 reads either MAC1 with the related identification code and franking number, or the identification code and the franking number in encoded form of said franking card 18. If present, the terminal code, which is stored in said franking card 18, will also be read.

On the basis of the read-in data, the franking machine 20 compiles, in a predetermined manner, a franking mark and prints this on the postal article 22, step 306. To this end, said franking machine 20, in a manner known per se, is provided with an opening in which the postal article 22 can be inserted, so that the franking mark can be printed on the postal article 22 with the aid of the printer 27.

The situation can be such, for example, that said processor 23 is able to check whether the franking value is sufficient in view of the weight of said postal article 22. To this end, said postal article 22 is weighed by the weighing means 25, which send a weighing signal to said processor 23. The franking number can, for example, belong to a certain sub-group of all unique franking numbers which are only allowed to be used for postal articles up to and including 50 grams. A separate sub-group of unique franking numbers is then available per weight class and per type of postal delivery. Said processor 23 can thus check directly whether the franking value is correct, and, if this is not the case, warn the user via a display (not shown).

The franking mark, for example, is printed in the form of a two-dimensional bar code 28 on the postal article 22. Preferably the franking mark comprises at least the following data: the related franking number, the identification code of the user, the terminal code of the terminal 2, and a franking machine code which identifies the franking machine 20. Preferably said data, provided with a further MAC (MAC2), are printed in the franking mark. Such a MAC 2 is calculated by SAM 19 in the franking machine 20 together with the franking card 18, which thereto must be provided with a processor (not shown). Alternatively, the data can also be printed in encoded form, in which case the encoding takes place with the aid of known cryptographic techniques (possibly including the placing of a digital signature). If desired, SAM 19 may keep track of a counter which, from a certain moment in time $t_o$, reflects the total amount spent on franking in the franking machine 20 up to the moment concerned. The content of this counter then also is part of the franking mark.

Optionally, the franking mark 28 can also comprise: address information of addressee and sender (possibly return address), service information such as "registered", "express delivery", etc., and date and time. This information can then be provided with a MAC and/or be encoded with the above-mentioned data with the aid of known cryptographic techniques.

After the franking machine 20 has printed the franking mark on the postal article 22, said franking machine 20 can render each following use of the used franking number on the franking card 18 impossible. This takes place in step 308. This may be done, for example, by deleting the related franking number on said franking card 18.

Upon dispatch of the postal article 22 from a sender to a receiver, said postal article 22 will, at a given time, arrive in a sorting center. There said postal article 22 will be read in with the aid of the means 32, and it can be checked again whether said postal article 22 has been sufficiently franked. The means 32 read at least the franking mark 28. The means 32 thus collect all read-in franking marks 28 of all postal articles which are provided therewith. All franking marks 28 are subsequently sent to the exchange 34 and are there read in by the processor 36 via the input means 44. Said processor 36 stores the inputted franking marks in the memory 42.

At an earlier stage, said processor 36 had already received data from the terminals 2 related either to franking numbers issued with related identification codes and MAC1's, or to encoded franking numbers with related identification codes. Said data were stored in the memory 40 by the processor 36. Thus said processor 36 is able to compare the data received via the input means 44, after storage in the memory 42, with the data stored in said memory 40. Thus it can be checked whether the franking numbers present in said memory 42 were indeed issued. If the franking number, the identification code, the terminal code and/or the franking machine code have been tampered with in any way, said processor 36 can derive this directly from the MAC1 and MAC2 or encoded data included in the franking mark. Said processor 36 can then further derive for which terminal 2 and/or which user irregularities have occurred. The identification code, after all, uniquely identifies the user and/or the SAM 3 in the terminal 2.

A further check takes place by processor 36 maintaining which unique franking numbers were sent- to the terminals 2, for example by storing said franking numbers in the memory 40. Of course said franking numbers can also be stored in another memory. In the first place, said franking numbers which were already sent to the terminals 2 can then not be sent again. In the second place, the data sent to the exchange 34 by the terminals 2 can then, in a first round, already be compared to the issued franking numbers, so that it can be checked directly whether the franking numbers issued by the terminals 2 were indeed franking numbers which were sent from the memory 38.

If the franking mark 28 possesses an identification code which uniquely identifies the owner of the bank card 16, it is possible to implement the invention with later payment. After all, from the received franking marks 28 the processor 36 can then unequivocally derive which customers have used which franking numbers. This opens the possibility that the means 32, for example, measure the weight of the postal article 22 and inform said processor 36 of the weight together with the franking mark 28. In that case, said processor 36 establishes at that time how much the customer must pay for sending the related postal article, one and the other being dependent upon, for example, the weight of the postal article 22 and the type of dispatch. The balance of the customer at the bank is then debited for the related amount in a manner known per se. Instead of this, of course, an invoice can be sent or the balance can be debited at another bank, with which, in a manner known per se, a communication link is established. The advantage of this alternative methode is that the issuance of franking numbers is not yet coupled to the value which is required in view of the weight and the type of dispatch of said postal article 22. The unique franking number is then only an identification of the postal article 22. The franking number does then not need to comprise information related to the franking value.

In theory, therefore, two types of cards are possible: loadable cards (for example chip cards) and non-loadable cards (for example magnetic strip cards). In theory, three different ways of payment are further possible in both cases: prepayment of each electronic postage stamp entirely, post-payment of each electronic postage stamp, and a combination of pre-paid and post-paid electronic postage stamps.

Figure 2B:
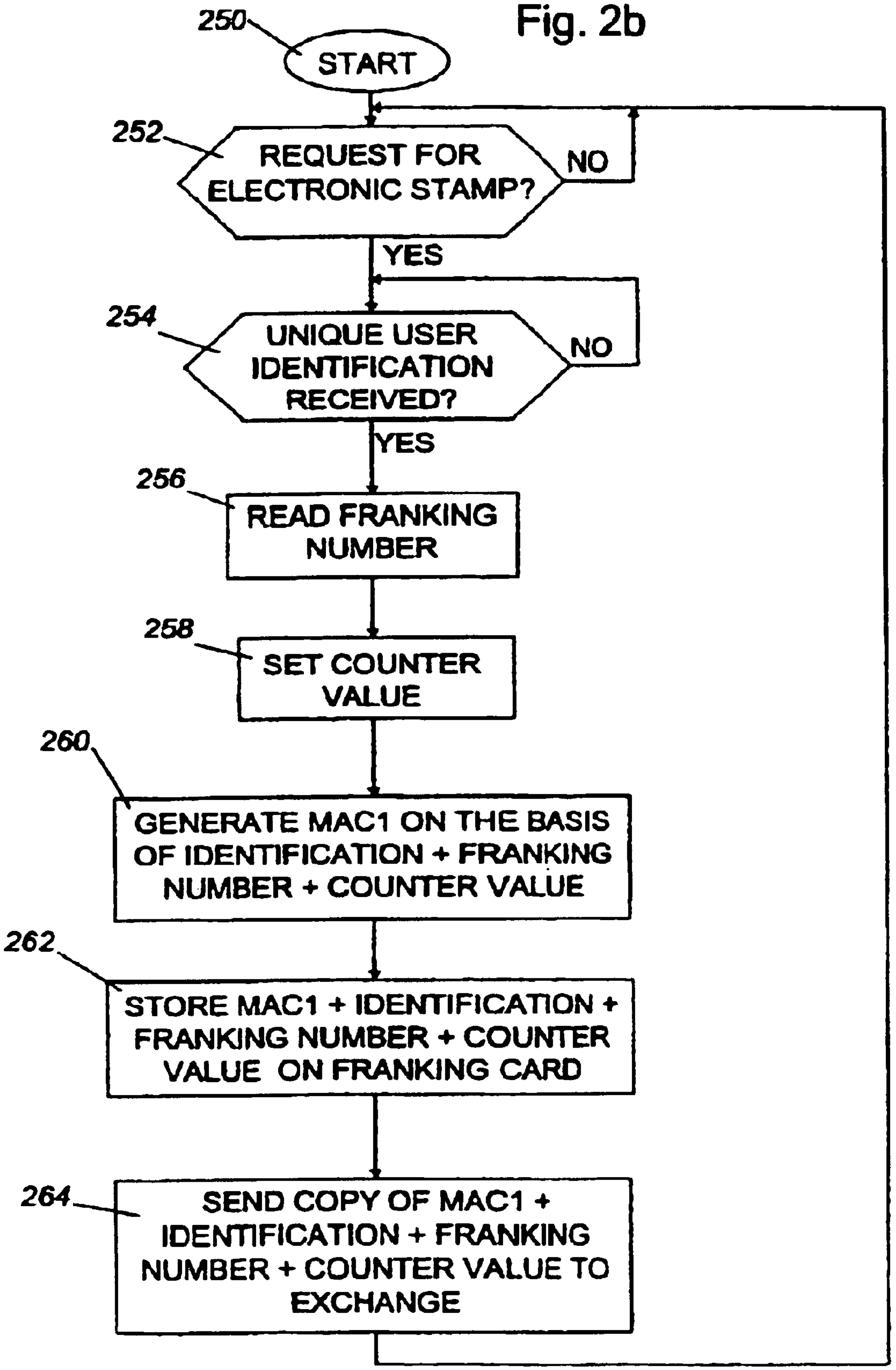
FIG. 2*b* shows the steps of a method for providing the electronic postage stamp in which use is made of a counter.
Figure 3B:
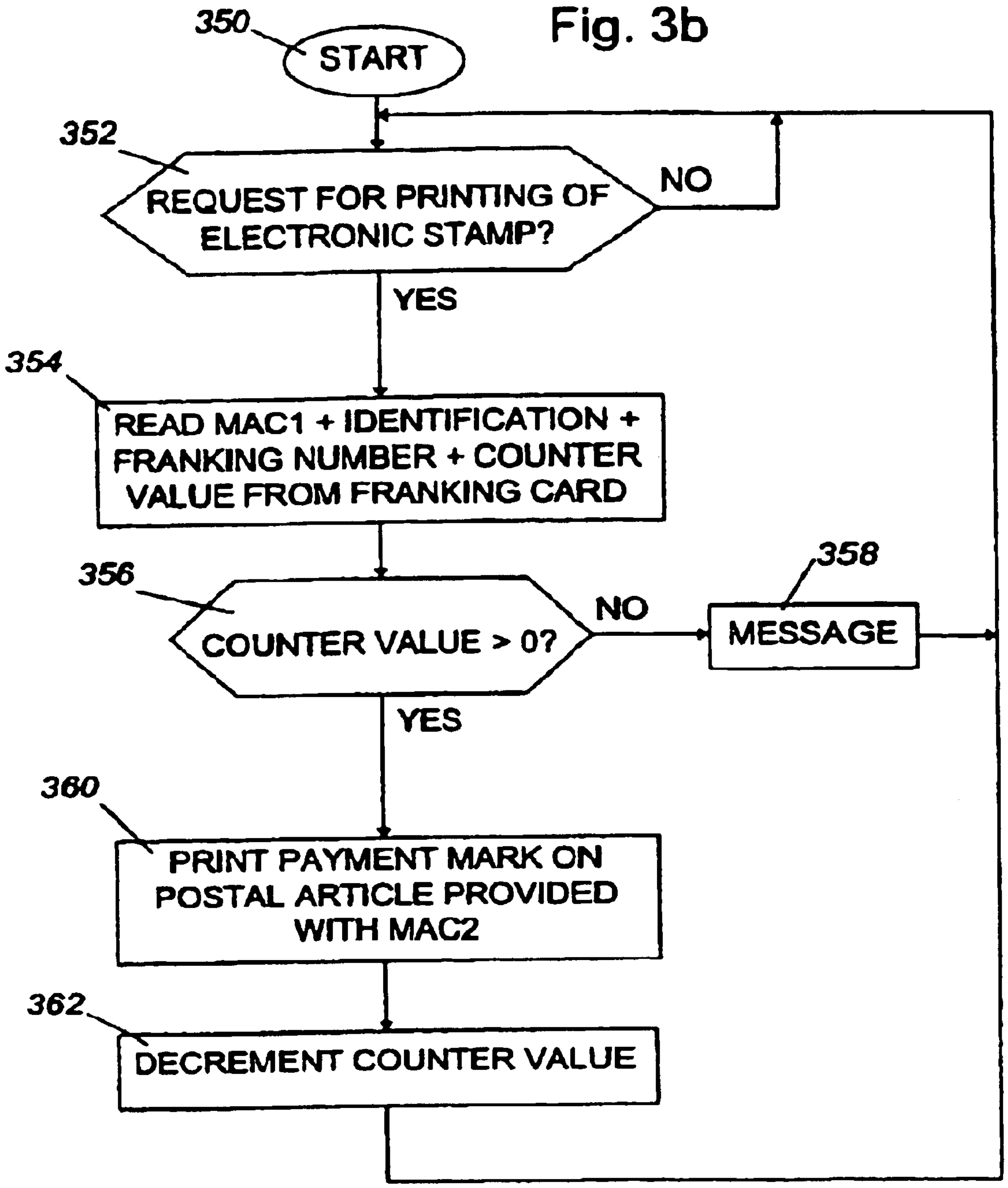
FIG. 3*b* shows the steps for printing an electronic stamp, in which use is made of a counter.

FIGS. 2*b* and 3*b* show flowcharts for an alternative embodiment of the method according to the invention. Said alternative method is related to an embodiment in which a unique franking number is not applied per postal article. In some cases, a customer could wish to frank 1000 or more postal articles, for example. With the means available at this time for storing data on credit cards and/or cards provided with magnetic strips, it is impossible to store such large amounts of unique franking numbers, consisting, for example, of 128 bits. This probleem can be circumvented by providing a franking number with a certain counter value.

The method for providing an electronic stamp with counter is explained on the basis of FIG. 2*b*. Step 252 corresponds to step 202 in FIG. 2*a*.

Step 254 shows in an abbreviated way that a user must identify himself, for example in the manner as explained on the basis of steps 204–210 in FIG. 2*a*.

Step 256 corresponds with step 212 in FIG. 2*a*.

After the processor 4 has read the franking number, said processor 4, in step 258, reads a counter value. Said processor 4 can do this, for example, by asking the user kJ via the monitor 8 to supply such a counter value. The magnitude of the counter value then determines the number of times that the related franking number may be used. Alternatively, the counter can represent a monetary value which can be expended on electronic postage stamps. The user can enter the counter value via the keys of the keyboard 10.

In step 260, said processor 4 generates MAC1 on the basis of the identification code of the user, the franking number issued and the counter value. Alternatively, said data can be stored in encoded form. The counter value, therefore, is then securely stored and can not be changed unnoticed.

In step 262, said processor 4 stores either MAC1 with the identification code, the franking number issued and the counter value, or the encoded data, on the franking card 18.

Again, said franking card 18 can have any embodiment such as explained above with reference to FIG. 2*a*.

In step 264, the processor 4 sends a copy of MAC1 with identification code, franking number and counter value, or the encoded form of said data, to the exchange 34. The exchange 34 again stores the data in the memory 40 and thus knows how often the related franking number may be used.

FIG. 3*b* shows a flowchart of the functioning of franking machine 20 for the embodiment in which use is made of a counter.

In step 352, the franking machine 20 waits until the customer has submitted a request for printing an electronic postage stamp. Said step corresponds to step 302 in FIG. 3*a*.

As soon as the customer has submitted this request, the franking machine reads either MAC1 with identification code, franking number and counter value, or said data in encoded form, from the franking card 18. This takes place in step 354.

In step 356, the processor 23 checks whether the read-in counter value is still greater than zero. If this is not the case, the related franking number is not allowed to be used further and an error message follows in step 358. After step 358, the program returns to step 352.

If the counter value is greater than zero, the program of the processor 23 proceeds with step 360. In step 360, said processor 23 controls the printer 27 in such a manner that the franking mark calculated by said processor 23 is printed on the postal article 22. Said franking mark is again preferably provided with MAC2. Alternatively, all data are printed in encoded form in the franking mark.

Thereafter, in step 362, the processor 23 decrements the counter value on the franking card 18 in order to indicate that the related unique franking number may be used once less, or to decrement the available value.

Of course the calculation of MAC2 also takes the modified counter value into account.

The actual counter value then forms part of the franking mark 28 on the postal article 22.

It is remarked that the combination of unique franking number and actual counter value then still entails a unique bit string. This latter bit string, however, then has more bits than the number of bits of the unique franking number.

The actual counter value is then jointly read by the means 32, and subsequently also stored in the exchange 34, via the input means 44 with the aid of the processor 36, in the memory 42. Said processor 36 then has the possibility of checking whether each combination of franking number and counter value is indeed used only once. Since the related information is protected by MAC2 or is securely stored by encoding, illicit modification of these numbers can be detected by processor 36.

Said processor 36 can also check whether the customer has used the franking number for the permitted number of times.

It will be clear that the embodiment according to iii FIGS. 2*b* and 3*b*, just as the embodiment according to FIGS. 2*a* and 3*a*, can be used with pre- and post-payment.

Optionally it is possible, in the embodiment according to FIG. 1, where use is made of the franking card 18, to restrict the use of the franking card 18 to a number of pre-selected franking machines 20. To this end, the franking cards 18 can be provided with those franking machine codes, related to said franking machines 20, on which the use of said franking card 18 is permitted.

A further option is to implement the system shown in FIG. 1 in such a manner that each of the franking cards 18 is also allocated a unique number. Possible fraud with franking cards 18 can then be pin-pointed. Information related to said fraudulently used franking cards 18 can then be included on an arbitrary franking card 18. Subsequently, said information, related to the fraudulently used franking cards 18, can then be transferred "unperceived" to the franking machines 20, which store the related information in a memory (not shown). If a customer with fraudulently used franking card 18 wishes to print an electronic postage stamp, the franking machine 20 can detect the related franking card 18 and render it invalid. This can be done either by deleting the contents of the franking card 18 or making them non-readable, or by simply refusing to print an electronic postage stamp. Thereby further damages by possible fraud can be decreased.

As an alternative for the use of a counter, a franking number, which for example can be used by the customer for a predetermined number of days, can also be used. This is only possible in the embodiment with which post-payment takes place. In that case, the franking number is still unique, but the franking number is used for more than one postal article 22. Since in that case a franking card 18 with a certain unique franking number can be used for a non-predefined number of times, it is preferable in such an embodiment to apply a PIN code which the user of the franking card 18 requires in order to use said franking card 18 on the franking machine 20. In that case, said franking machine 20 must be arranged such that it can check the PIN code associated with said franking card 18.

Figure 5:
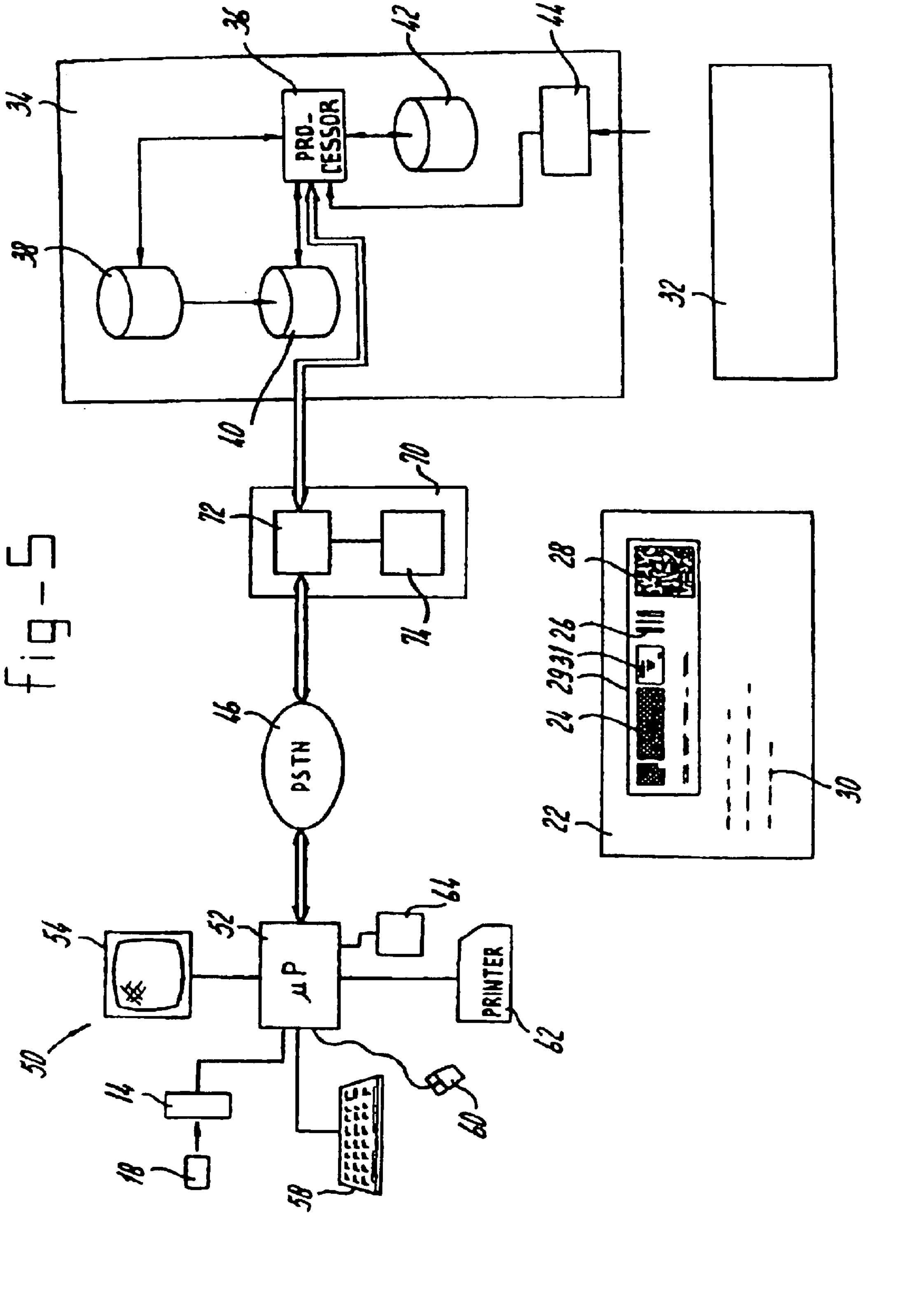
FIG. 5 shows a system according to the invention, in which use is made of a personal computer.

FIG. 5 shows an alternative embodiment of the invention in which use is made of a PC of a user instead of a terminal 2 such as shown in FIG. 1.

Parts which are identical in FIGS. 1 and 5 have the same reference numbers.

In FIG. 5, reference number 52 designates the microprocessor of the PC 50 of a user. The microprocessor 52 is connected to a monitor 54, a printer 62, a keyboard 58 and, if desired, a mouse 60. In one embodiment, the microprocessor is also connected to input/output means 14, which can accept a bank card 18 (multi-functional chipcard). For calculating MAC's or for determining the codes of the data to be printed, the microprocessor 52 can be coupled to a SAM 64.

The microprocessor 52 is connected, for example via the PSTN, to a server system 70 to which several computersystems can be connected. Several server systems can be provided, each with their own connections to PCs. Said server system 70 is connected to the exchange 34. Said server system 70 comprises a server processor 72, to which a SAM or HSM (=Host Security Module=a computer system with the same functionality as a SAM, but with much larger capacity) 74 is connected.

The communication between said PC 50 and the server system 70 can, for example, take place with an Internet protocol (IP).

Figure 4B:
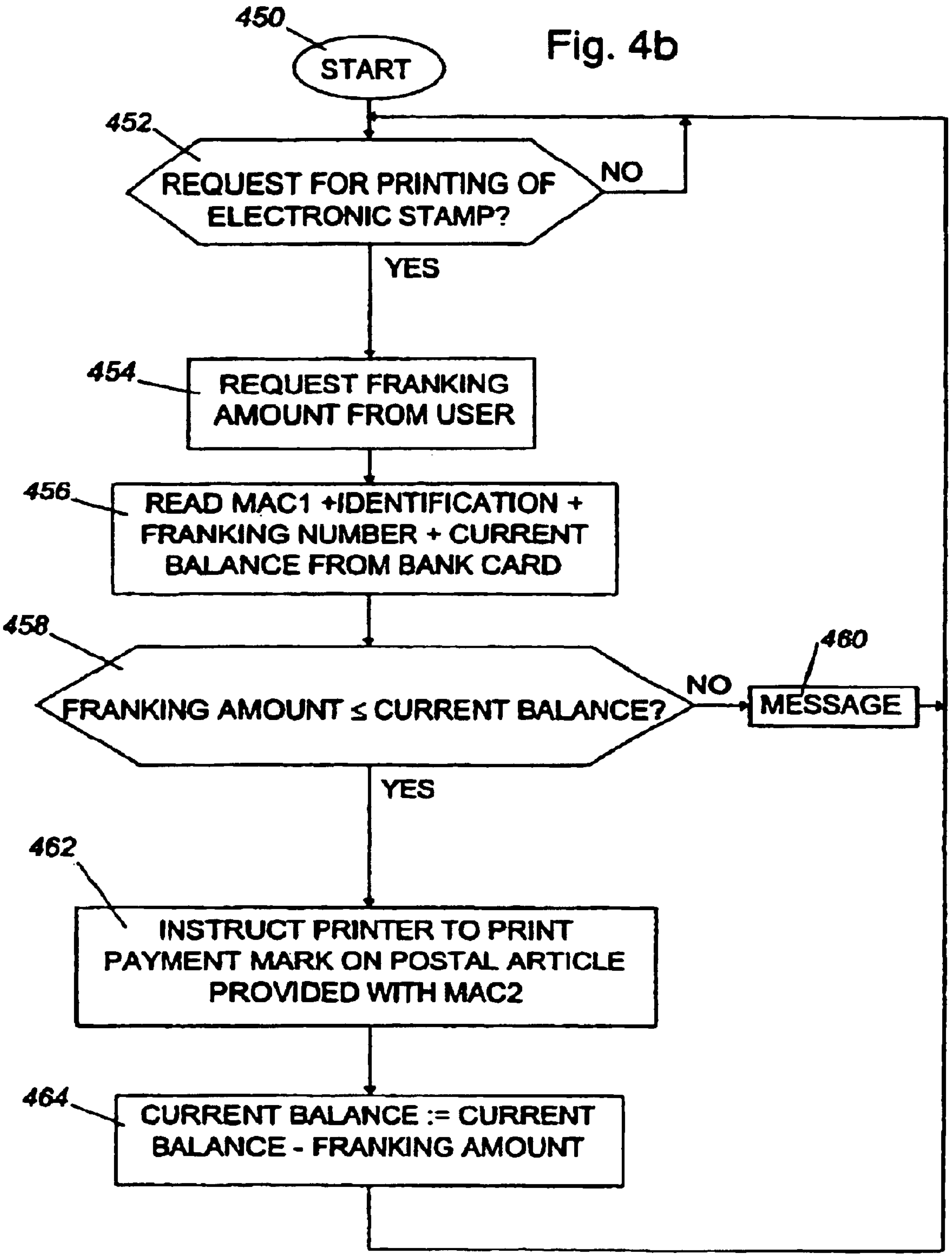

FIG. 4*a* shows a flowchart of an embodiment of the functioning of the PC 50 in the context of the present invention for reloading a bank card 18 with a certain desired amount to be spent on electronic stamps. FIG. 4*b* relates to the actual printing of such an electronic stamp with such a bank card 18.

In step 402, the microprocessor 52 waits until a user submits a request for providing an amount for one or more electronic postage stamps. For executing such a request, the user makes use of the known input means, such as keyboard 58 and/or mouse 60. In this regard, the user first inserts his bank card 18 in the input/output unit 14.

The microprocessor 52, via the monitor 54, thereafter asks the user to identify himself in a unique manner, step 404. This can be done, for example, by the user inserting his bank card 18 in the input/output means 14, so that the microprocessor 52 can read the number of said bank card 18. Subsequently the user shall have to identify himself, for example with the aid of a PIN code, in order to make clear that he is the legitimate user of said bank card 18. The checking of the PIN code preferably takes place, as known in the prior art, on the bank card 18 itself. Said microprocessor 52 can subsequently assume that the user has been identified in a unique manner with the aid of the bank card number, for example. This takes place in step 404. Alternatively, the microprocessor 52 can ask the user to enter the combination of bank card number and PIN, or another unique combination, via keyboard 58, after which this data is checked locally by the PC 50. In that case, said PC 50 must have this combination of data securely stored.

In step 406, the microprocessor requests a unique franking number at the exchange 34. This occurs in a same way as explained above with reference to the FIGS. 2*a* and 2*b*.

Subsequently the SAM 74 of the server system 70, together with the bank card 18, generates a MAC, MAC1 on the basis of the identification code of the user, the related franking number and the balance that was made available for electronic stamps. Alternatively, said server system 70 calculates enciphered data for the identification code, the franking number and said balance. This takes place in step 408.

In step 410, the microprocessor stores, at choice, MAC1, the identification code, the franking number and said balance on the bank card 18. If an encoding step has taken place instead of a MAC calculation, the enciphered data of the identification code, the franking number and the said balance are stored on the bank card.

In step 412, the server system 70 sends a copy of either MAC1, the identification code, the franking number and the balance, or the enciphered data of the identification code, the franking number and the balance, to the exchange 34. Said exchange 34 will again store said data in its memory 40.

After step 412, the storage of a balance on the bank card 18 that can be used for electronic stamps is completed.

FIG. 4*b* shows how a user, with his bank card 18 which has thus been provided with a balance, can instruct the PC 50 to print a franking mark on a postal article.

After the related program is started, step 450, said PC 50 waits until the user has submitted a request for printing a franking mark, step 452.

Via step 454, said PC 50 experiences how high the postage costs must be that are to be processed in the franking mark. The user can enter the postage costs, for example, via the keyboard 58. It is imaginable that this step is automated with the aid of an automatic weighing device (not shown), connected to said PC 50, which weighs the postal article, after which the postage costs are automatically determined and passed on to said PC 50.

The user has brought his bank card 18 into contact again with the input/output means 14 and has identified himself again with the aid of his PIN code. The microprocessor 52 reads MAC1, the identification code, the franking number and the actual balance of the bank card 18, step 456.

The microprocessor 52 subsequently checks, step 458, whether the actual balance is sufficient for the desired postage costs. If not, a message to the user then follows in step 460, entailing, for example, that the user must restore his balance on the bank card.

In step 462, the microprocessor 52 instructs the printer 62 to print a franking mark, calculated by the SAM 64, on the postal article 22 after the user has inserted the postal article 22 in the printer 62. In that regard, SAM 64; together with the bank card 18, calculates MAC2 on the basis of all data which are included in the franking mark, among which: the identification code, the unique franking number, the actual balance and the postage costs. As an alternative for calculating a second MAC, MAC2, said data can be encoded. The data preferably also contains a PC-code which uniquely identifies said PC 50.

After step 462, the actual balance is decremented in step 464 by subtracting the postage costs therefrom. The new actual balance then represents the amount that is still available for further electronic stamps.

It is remarked that in the embodiment which is described on the basis of FIGS. 4*a*, 4*b* and 5, a unique franking number is used just until the original balance is expended. However, since the actual balance and the actual postage costs are also included in each franking mark, there is still a unique bit string per postal article.

After step 464, the program returns to step 450.

The payment by the customer preferably takes place at the moment the customer restores the balance on his bank card. This can takes place electronically in a manner known per se. In that regard, the debiting can again take place, via the exchange 34, from a central bank balance, or directly from the bank card 18 if this comprises an electronic purse.

It is also imaginable, however, to let payment be made later, as explained above with, reference to the embodiment of FIG. 1. In that regard, the balance loaded in the bank card 18 does not represent a total amount which can be expended on electronic stamps, but the number of times that the franking number provided can be used. The advantage of post-payment is that the user does not need to weigh his postal article 22 in advance in order to have the correct franking value included in the franking mark 28. After all, the franking mark here too uniquely identifies the user, who can subsequently have the invoice sent to him or whose bank balance can be automatically debited. Moreover, the presence of the unique franking number with identification code and the actual "balance" guarantees that each postal article 22 is uniquely identified, so that fraud can be detected immediately.

It is further remarked that, instead of or together with an identification of the user, it is possible to include an identification of the SAM 64 in the franking mark. In that case, the owner of the PC 50 with SAM 64 is responsible for the correct payment of the electronic postage stamps and for possible fraud carried out with the PC 50. It is then up to said owner to subject access to the program for purchasing an electronic postage stamp to authorization rules.

In a further embodiment with the aid of a PC 50, a standard PC without SAM 64 can be used. In this case, said PC 50 cannot safely calculate MAC's. The franking mark is then produced either centrally in the exchange 34 or in server system 70, and sent to said PC 50. Said PC 50 then combines the received franking mark with possible other information and prints this on the postal article 22 with the aid of printer 62. In that case, instead of working with the storage of a balance for electronic stamps on bank card 18, one franking mark per time is retrieved from the exchange 34. In this case, payments of electronic postage stamps preferably take place directly either by debiting a user's bank balance, or from bank card 18 with an electronic purse. To contend with possible fraud, the user must uniquely identify himself, for example with his giro/bank number and an associated PIN. Preferably, identification then still takes place with bank card 18 and by checking a PIN code.

Furthermore, it will be clear to the expert that, although all processors and SAMs described up to here have been shown as single blocks, they may be implemented in practice in any other known way, i.e., as, for example, several cooperating subprocessors which, at choice, are placed at some distance from each other and provide the desired functionality. They are preferably controlled by software but, where necessary, they may comprise analogue and digital circuits.

What is claimed is:

1. A method for producing and printing a franking mark on a postal article, comprising:

a) generating and storing a set of unique bit strings in a first memory in a central office connected to a plurality of terminals;

b) making available one or more of said unique bit strings to one of said terminals;

c) establishing an identification code;

d) transmitting data including a copy of said unique bit strings in combination with said identification code to said central office, and storing said data in a second memory;

e) generating a franking mark which at least comprises information relating to one of said unique bit strings and the identification code, and f) securely printing the franking mark on the postal article.

2. The method according to claim 1, wherein prior to step f, the following steps are performed:

protecting the unique bit string and the identification code with one of the aid of a first message authentication code and by encoding;

storing the unique bit string and the identification code by a terminal on an information carrier with memory; and performing step f after reading of the information carrier by a printing device.

3. The method according to claim 2, wherein in addition to the unique bit string and the identification code, storing a terminal identification code, protected with one of the aid of the first message authentication code and by encoding, on the information carrier with memory by the terminal.

4. The method according to claim 2, wherein after the reading of the information carrier by the printing device, use of the unique bit string for printing a further franking mark on a further postal article is rendered impossible by the printing device.

5. The method according to claim 2, wherein after reading the information carrier, it is checked whether the value of a counter on the information carrier lies within predefined limits, and, if this is the case, the value of the counter is adjusted after reading and step f is executed, and, if this is not the case, step f is blocked.

6. The method according to claim 2, wherein on the basis of the franking mark calculating a second message authentication code and printing in encoded format at least one of the second message authentication code and the franking mark.

7. The method according to claim 1, wherein upon execution of step f, use is made of a computer and a printing device connected thereto.

8. The method according to claim 1, wherein the identification code comprises at least one of a user identification code and a printer identification code.

9. The method according to claim 1, further comprising the steps of reading in franking marks printed on postal articles, storing combinations of identification codes and unique bit strings which are present in the read-in franking marks in a third memory and comparing said read-in franking marks to said data in the second memory.

10. The method as claimed in claim 1, wherein said identification code is unique to each one of said terminals so that a point of origin of said postal article is determinable based on said identification code.

11. The method as claimed in claim 1, further comprising a step of:

g) mailing the postal article.

12. A system for producing and printing a franking mark on a postal article, comprising a central office and a plurality of terminals provided with a printer, wherein:

a. the central office is arranged to generate and store a set of unique bit strings in a first memory;

b. the central office is arranged to make available one or more of said unique bit strings to one of said terminals;

c. said terminals are arranged to establish an identification code;

d. said terminals are arranged to transmit data including a copy of said one or more unique bit strings in combination with said identification code to said central office, said central office being arranged to store said data in a second memory;

e. said terminals are arranged to generate said franking mark which at least comprises information relating to one of said unique bit strings and the identification code, and f. each printer is arranged for securely printing the franking mark on the postal article.

13. The system for printing a franking mark according to claim 12, wherein, each terminal is arranged to store, after generating said franking mark, the unique bit string together with the identification code, protected by at least one of the aid of a first message authentication code and encoding, on an information carrier with memory, and each printer is arranged to execute said printing after reading the information carrier.

14. The system according to claim 13, wherein the terminal is also arranged to store, besides the unique bit string and the identification code, a terminal identification code, protected by at least one of the aid of the first message authentication code and encoding, on the information carrier with memory.

15. The system according to claim 13, wherein the printer is arranged, after reading the information carrier, to render use of the unique bit string for printing a further franking mark on a further postal article impossible.

16. The system according to claim 13, wherein the printer is arranged, after reading the information carrier, to check whether the value of a counter on the information carrier lies within predefined limits, and, if this is the case, to execute said printing and to adjust the value of the counter after reading, and, if this is not the case, to block said printing.

17. The system according to claim 12, wherein the system comprises a computer, said printer being connected thereto for executing said printing.

18. The system according to claim 17, wherein the system is provided with means arranged remotely from the computer to send the unique bit string, together with the identification code, protected by at least one of a message authentication code and encoding, to said computer and to send said data to said central office.

19. The system according to claim 12, wherein the identification code comprises at least one of a user identification code and a printer identification code.

20. The system according to claim 12, wherein the system is arranged to calculate and print, on the basis of the franking mark, at least one of a message authentication code and the franking mark in encoded form.

21. The system according to claim 12, wherein that the system further comprises central input means for inputting franking marks printed on postal articles, a third memory for storing the combinations of identification codes and unique bit strings present in the inputted franking marks, and processor means, connected to the central input means and the first, second, and third memories, for mutually comparing data in the second and third memories.

22. The system as claimed in claim 12, wherein said identification code is unique to each one of said terminals so that a point of origin of said postal article is determinable based on said identification code.

23. Printing device that is structured and arranged for printing a franking mark on a postal article, said printing device at least being structured and arranged for receiving data from an information card, said data at least comprising a unique bit string originating from a set of unique bit strings, said printing device comprising means for compiling said data and making said data available for the franking mark for the postal article in machine-readable form, so that said device can print the franking mark on the postal article in the machine-readable form, said franking mark at least comprising said data as well as a code identifying said printing device.

* * * * *